June 16, 1942.  R. A. LYNN ET AL  2,286,494
SOUND TRANSLATING SYSTEM
Filed Feb. 28, 1940
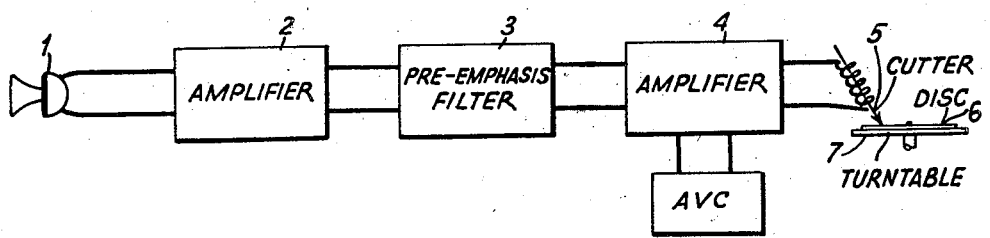
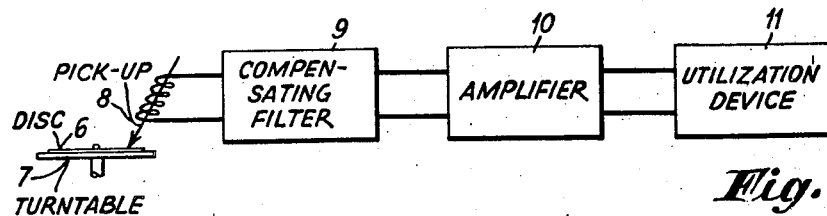
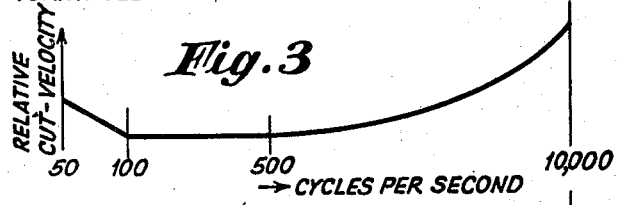
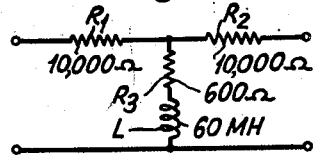
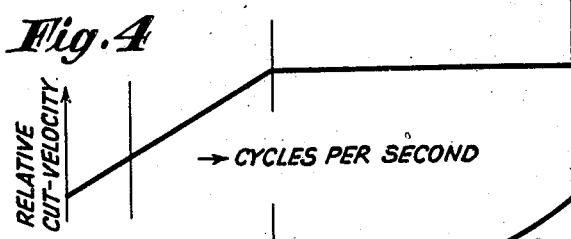
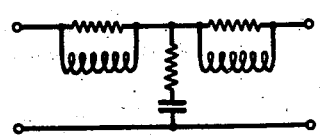
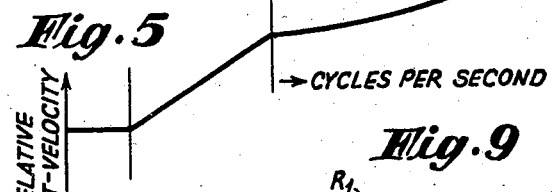
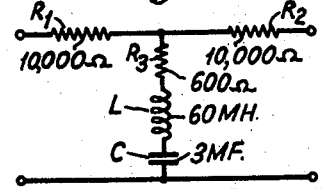
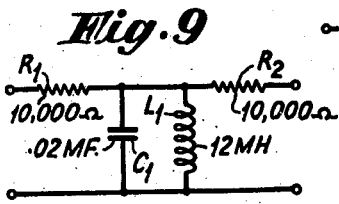
INVENTORS
ROLAND A. LYNN
JARRETT L. HATHAWAY
BY H. S. Srover
ATTORNEY Patented June 16, 1942

2,286,494

UNITED STATES PATENT OFFICE 2,286,494

SOUND TRANSLATING SYSTEM

Roland A. Lynn, Teaneck, N. J., and Jarrett L. Hathaway, Manhasset, N. Y., assignors to Radio Corporation of America, a corporation of Delaware Application February 28, 1940, Serial No. 321,186

12 Claims. (Cl. 179—100.4)

This invention relates to the art of sound recording and reproducing and more particularly to improvements in this art whereby recording and play-back may be so accomplished as to provide extremely high quality of transcriptions and reproduction.

It is an object of our invention to provide a recording system which over-emphasizes the extreme low and extreme high audio frequencies, and a play-back system which, in the reproducing process, compensates for this over-emphasis.

It is another object of our invention to provide a system of recording and reproduction which will be relatively free from noise and distortion.

It is well known in the art that recording disc cutters may be made to travel over a sound record path at a constant lateral velocity regardless of the frequency of the audio wave. It is also possible to make the lateral velocity directly proportional to the frequency. For example, in United States Patent #2,139,916, granted December 13, 1938, to Stuart W. Seeley, it has been shown that, between certain limits, the velocity of the recording cutter may be made directly proportional to the frequency. In prior art practice, somewhat satisfactory results were obtained where a directly proportional velocity-to-frequency relationship was maintained between the limits of 50 cycles and 500 or 1000 cycles per second. Above 500 or 1000 cycles per second it was, however, found desirable to allow the velocity of cut to remain constant with rising frequency. The reason for such a characteristic was explained in that cut-amplitude, as distinguished from cut-velocity, is inversely proportional to frequency where the velocity is held constant over the entire range. Thus excessive swing or over-cut results on the lower frequencies. Were the amplitude held constant over the entire range (velocity proportional to frequency) overloading would occur on high frequencies before full advantage was taken of the groove width at low frequencies.

It has been determined that with sine wave tone, fed into the conventional cutter having a 500 C. P. S. turning point, overloading on the high frequencies and overcutting on the low or medium frequencies occur at essentially the same level. Earlier engineering practice indicated that such a system was optimum—that is, one which would operate equally well over the entire audio spectrum.

Our invention will be described in more detail, reference being made to the accompanying drawing in which Figure 1 shows diagrammatically an arrangement of component units suitable for what we term "pre-emphasis," or "orthacoustic recording";

Fig. 2 shows, also diagrammatically, a combination of units suitable for reproducing a transcription with proper compensation for the pre-emphasis so as to restore the reproduced sound to its original values at all frequencies;

Fig. 3 shows a curve of electrical response of the amplifier system in relation to frequency as obtained when it is desired to exaggerate or pre-emphasize both the high and low frequencies without causing overload to the system;

Fig. 4 shows a characteristic curve of cut-velocity in relation to frequency which results from the electromechanical design of the cutter head as used in the heretofore known recording systems;

Fig. 5 shows a characteristic curve of cut-velocity in relation to frequency when the recording units are assembled in such manner as to combine the effects of the characteristics shown in Figs. 3 and 4;

Figs. 6, 7 and 8 are typical filter networks such as may be employed for producing the desired characteristic curves of velocity versus frequency; and Fig. 9 is a filter suitable for play-back compensation.

Tests conducted over an extended period have shown that in typical programs most of the energy lies between the frequencies of 150 and 500 C. P. S. Above and below these frequencies the program components are extremely important from a quality standpoint, but play only a small part in establishing the program peak levels. It is, therefore, possible to over-exaggerate or pre-emphasize the high and low frequencies without causing overload of a system which will equally accept all frequencies. The curve shown in Fig. 3 has been found practical for pre-emphasizing the extreme low and high frequencies when feeding a system as described above. This curve results in overload being almost as likely to occur at one frequency as another, instead of predominately occurring within the 150 to 500 C. P. S. range. Thus it is possible to preserve essentially the same program level around 300 C. P. S. and at the same time increase the level on the extreme lows and highs.

To properly reproduce a pre-emphasized transcription, it is necessary to apply compensation to the reproducer circuit which has a characteristic that is the inverse of the recorded characteristic. By applying this compensation, the various noises and distortions introduced in the recording and reproducing channel between the points of pre-emphasis and compensation are greatly reduced, thereby giving rise to superior transcription reproduction.

Application of the pre-emphasis characteristic of Fig. 3 to the heretofore conventional recording characteristic of Fig. 4 gives the resultant curve of Fig. 5. Since the play-back apparatus must give essentially an overall flat reproduction it is equipped with suitable filters.

Referring to Fig. 1, we show a suitable arrangement of units for performing an operation of transcription in accordance with our invention. The microphone is conventionally shown at 1 feeding to an amplifier 2 the output from which is suitably filtered in a pre-emphasis filter 3 for obtaining the necessary characteristic of response versus frequency. The output from the pre-emphasis filter 3 is taken through an automatic volume controlled amplifier 4 and delivered to the cutter head 5 which operates on the disc 6, resting on the turntable 7. Details of filter networks and volume control which may be included in the units 3 and 4 will be hereinafter given.

Referring to Fig. 2, we show a system for reproduction in which the turntable 7 carries a recorded disc 6, the record track of which is traversed by a pick-up device 8. The electric waves from the pick-up device are fed to a compensating filter 9. This compensating filter inverts the characteristic obtained by the pre-emphasis filter 3 and delivers the high quality audio waves to an amplifier 10, the output from which may be carried to any suitable utilization device 11 such as a loud speaker or the modulator for a broadcasting transmitter.

A simple method of obtaining the required recording filter characteristics is to use simple networks, as shown in Figs. 6, 7 and 8. Here high frequency pre-emphasis is characterized by the impedance characteristic of a two element series inductive-resistive network with a time constant of 100 microseconds. Typical values for the network of Fig. 6 are $R_1=10{,}000$ ohms, $R_2=10{,}000$ ohms, $R_3=600$ ohms, $L=60$ millihenries. In order to obtain the low frequency pre-emphasis, a circuit such as shown in Fig. 7 may be used in conjunction with the high frequency pre-emphasis filter of Fig. 6. However, because of the obvious complications involved, such a filter is not warranted in practice. A practical combination giving the exact high frequency pre-emphasis curve and almost the exact low frequency pre-emphasis is shown in Fig. 8. This is generally used in our preferred installation.

The play-back filtering system depends, of course, on the characteristic of the play-back head. Many play-back units have a loss below 100 C. P. S., approximating the desired curve, due to mechanical or electrical design of the unit or its supporting arm. The high frequency compensation also is often partially within the unit itself. In case of a flat play-back head, high and low frequency compensation may be inserted electrically by means of a filter, as shown in Fig. 9. Here $R_1$, $R_2$ may be 10,000 ohms, $C_1=.02$ mf., and $L_1=12$ h. The pre-requisite for high frequency compensation is to have the time constant of the capacity and the total resistance shunting it equal to about 100 microseconds. The use of the inductance $L_1$ for low frequency compensation is optional and often times unnecessary since in most of our installations the desired compensation occurs within the pick-up device itself.

Overall results, using the orthacoustic curve of Fig. 5, are superior to those obtainable with other curves. Experimental results show apparent record scratch to be diminished by at least 10 db. and machine rumble and hum to be reduced by at least 6 db., assuming a given overall record-playback characteristic. In addition to the noise reduction, harmonic distortion becomes less apparent, since the high order, high frequency harmonics which cause the most objectionable crackling type of distortion are reduced in the playback process.

The use of a supplementary automatic audio volume control system in orthacoustic recording has been found very beneficial in the prevention of over-cut and in raising the average level of cut to overcome noise problems. We have found, for example, that the volume control system described in an application of J. L. Hathaway, Serial No. 232,273, filed September 28, 1938, is particularly serviceable in this connection.

In following the prescribed standard characteristic for recording orthacoustic transcriptions, it is to be noted that the amount of pre-emphasis used is based upon the usual distribution of energy throughout the aural frequency spectrum. It is to be expected that exceptional program content will be encountered which exceeds this given energy distribution curve. Normal operating procedure is to have the recording system adjusted to fully modulate a groove for average program conditions. With this adjustment it is seen that the limits of the recording system are exceeded for programs having more than the usual amount of high frequency or extreme low frequency energy.

Therefore, to avoid overloading, it is necessary to use an automatic audio volume control in the recording channel, preferably in the circuits after the introduction of pre-emphasis.

For the general run of programs satisfactory operation ensues with the automatic audio gain control giving uniform control action for all frequencies. However, there are exceptional cases where the program material displays prolonged periods of high energy content in the pre-emphasized region, such as those which contain muted trumpets, cymbals, gourds, harmonicas or other high pitched musical instruments playing fortissimo. Under these conditions the automatic audio gain control prevents the limits of the recording system from being exceeded. The resulting transcription, however, would reproduce at low sound level during these high level, high frequency passages, as judged by the ear, since the ear judges sound levels primarily by the loudness of the mid frequencies (approximately 200 C. P. S. to 1000 C. P. S.).

To avoid the resulting low sound levels, even though some distortion may occur, it is desirable to alter the characteristic of the automatic audio gain control pertaining to responsiveness to various frequencies. Experience indicates that satisfactory results will ensue if the responsiveness of the automatic audio gain control decreases with increasing frequencies from 500 C. P. S. upward. The amount by which the responsiveness in our system drops off is represented by a curve which is approximately one half of the value of the applied pre-emphasis. Thus at 10 kc. where 16 db. of pre-emphasis is applied, the automatic audio gain control is made so responsive that the tone will have to reach a level 8 db. higher than that which would cause control action at 500 C. P. S. On the extreme low frequencies similar control characteristics are desirable. The above described operation of the automatic audio gain control has been designated as selective frequency control and is highly desirable for optimum recording even though the use of selective frequency control permits the limits of the recording system to be occasionally exceeded. The resulting effect is not unpleasant to the ear for the following reasons:

1. The amount of excess is reasonably small and generally short in duration.

2. The excess occurs only on fortissimo selections where resulting distortions are not readily apparent.

3. The excess occurs only in the higher frequency spectrum where the preponderance of resulting distortions falls outside the aural spectrum.

4. The amount of selective frequency control was arrived at by subjective tests and is deemed to be satisfactory.

It will be apparent to those skilled in the art that the principles and practices set forth in the foregoing specification may be followed not only for the purpose of making sound records on discs and for reproducing from discs, but also when the sound is to be recorded on film. Generally speaking, it is true that not only the cutter head but also the structure of a light valve, such as used in film recording, possesses characteristics which are influenced by the frequency of the sound waves. The pre-emphasis filter as used in our system of sound recording may, therefore, be adapted either to the characteristics of the disc cutter or of the light valve for film recording so as to produce the ultimate pre-emphasis characteristic as shown in Fig. 5. Likewise in the sound reproducing process a compensating filter may be used such as will restore the original dynamic values of the sound waves at all frequencies, even when sound films are used.

Various modifications of our invention may suggest themselves to those skilled in the art. The scope of the invention is, therefore, limited only in accordance with the claims.

We claim:

1. In the art of sound translating and reproducing, the method which comprises translating the sound into electrical waves, filtering such of said waves as lie at the low frequency end of the audible spectrum so as to derive a substantially flat response characteristic of cutter velocity in relation to frequency, filtering such of said waves as lie in the intermediate portion of the audible spectrum so as to derive a response characteristic wherein the cutter velocity rises in direct proportion to the frequency, and filtering such of said waves as lie above said intermediate portion of the audible spectrum so as to derive a response characteristic wherein the cutter velocity rises non-linearly in relation to the frequency.

2. The method as defined in claim 1 and including the further step of inverting the response characteristic throughout the audible spectrum, thereby to reproduce said sound waves with fidelity to their original dynamic values.

3. In the art of sound translating and reproducing, the method of controlling the amplitude of electrical waves corresponding to the applied sound waves, which comprises the translating steps of filtering a band of said electrical waves at the low frequency end of the audible spectrum with uniform gain, filtering waves of an intermediate audio band in such manner that the gain is directly proportional to the frequency, filtering waves of an audio band lying above said intermediate band in such manner that the gain rises non-linearly in relation to the frequency; said method comprising further the reproducing steps of filtering the waves in each of the three said audio bands in such manner that the gain characteristics are inverted with respect to the gains first stated, whereby the original amplitude relations of all the sound waves are restored.

4. The method according to claim 3 as applied to radio broadcasting.

5. The method according to claim 3 as applied to sound recording on film.

6. In a sound recording system, means for translating sound waves into electrical waves; an amplifier connected to said means; a filter fed with output energy from said amplifier, said filter having different types of response in different portions of the audio frequency spectrum, said response to frequencies below 100 cycles per second being substantially inversely proportional to frequency, said response to frequencies between 100 and 500 cycles per second being substantially flat, and, as to frequencies above 500 cycles per second, having a rising characteristic such as determined by a series inductive-resistive circuit having a time constant of substantially 100 micro-seconds; an electrically operated recording device; and an amplifier in circuit between said filter and said recording device, the last said amplifier comprising an automatic volume control device having decreased control responsiveness at the lower and upper portions of the audio frequency spectrum.

7. In a sound recording system according to claim 6, and in the filter thereof, a series circuit in one side of the line composed of a pair of ohmic resistors, and a parallel circuit connected to the junction between said resistors and the other side of the line, said parallel circuit comprising a concatenation of resistive, inductive and capacitive units.

8. In a sound reproducing system, means for producing electrical waves corresponding in frequency with the track waves on a record, said track waves being formed in accordance with certain cut-velocity characteristics relative to frequencies in different bands of the audio-frequency spectrum, said characteristics in relation to the original sound being substantially flat at the low end of the scale, being proportional to frequency in the middle register, and having a rising ratio between cut-velocity and frequency, as to frequencies in the upper register, a sound reproducing device to be controlled by electric waves, and filtering means interposed between the first said means and the reproducing device, said filtering means having constants such that the cut-velocity characteristics of the track waves are suitably compensated for restoring the amplitude characteristics of said original sound.

9. In a sound reproducing system according to claim 8, and in the filtering means thereof, a pair of series-connected resistors, and a parallel-disposed capacitor connected from the junction between said resistors to an oppositely phased connection between input and output terminals of said filtering means.

10. In a system for sound recording, means for translating sound into electrical waves, recording mechanism having a cutter movable under control of said electrical waves, and a filter electrically interposed between said translating means and said recording mechanism, said filter being arranged to pass such of said electrical waves as lie at the low frequency end of the audible spectrum so as to derive a substantially flat response characteristic of cutter velocity in relation to frequency, said filter being also arranged to pass such of said electrical waves as lie in the intermediate portion of the audible spectrum so as to derive a response characteristic wherein the cutter velocity rises in direct proportion to the frequency, and said filter being further arranged to pass such of said waves as lie above said intermediate portion of the audible spectrum so as to derive a response characteristic wherein the cutter velocity rises non-linearly in relation to the frequency.

11. Apparatus for reproducing a sound record comprising a sound record pick-up device, means for translating electrical waves into sound, and a filter electrically interposed between said pick-up device and said translating means, said filter being arranged to derive a response characteristic of record-groove velocity in relation to sound frequency which is substantially flat at the low frequency end of the audible spectrum, which is inversely proportional to the frequency of the electrical waves lying in an intermediate portion of the audible spectrum, and which bears a non-linear inverse ratio to the frequency of the electrical waves lying at the high end of the audible spectrum, thereby to compensate for non-linearity of the record-groove amplitude characteristic in relation to the frequency, and to cause reproduction of sound with fidelity to its original dynamic values.

12. In a sound translating and reproducing system, a filter for filtering a band of electrical waves at the low frequency end of the audible spectrum in such manner that the gain is substantially uniform, said filter being also arranged to filter waves of an intermediate audio band in such manner that the gain is directly proportional to the frequency, and said filter being further characterized in that it filters waves of an audio band lying above said intermediate band in such manner that the gain rises non-linearly in relation to the frequency; in combination with a second filter effective to pass audio waves corresponding to the output from the first said filter and to filter said waves in such manner that the gain characteristics are inverted with respect to the gains first stated, whereby the original amplitude relations of all the sound waves are restored.

ROLAND A. LYNN.
JARRETT L. HATHAWAY.